(12) United States Patent
Bohn

(10) Patent No.: US 10,998,002 B2
(45) Date of Patent: May 4, 2021

(54) AUDIO TIME STRETCHING

(71) Applicant: NXP B.V., Eindhoven (NL)

(72) Inventor: Sebastian Bohn, Dresden (DE)

(73) Assignee: NXP B.V., Eindhoven (NL)

( * ) Notice: Subject to any disclaimer, the term of this patent is extended or adjusted under 35 U.S.C. 154(b) by 583 days.

(21) Appl. No.: 15/610,060

(22) Filed: May 31, 2017

(65) Prior Publication Data

US 2018/0350403 A1    Dec. 6, 2018

(51) Int. Cl.
| | |
|---|---|
| *G11B 27/00* | (2006.01) |
| *H04N 5/783* | (2006.01) |
| *G10L 21/04* | (2013.01) |
| *G11B 20/10* | (2006.01) |
| *H04N 21/414* | (2011.01) |
| *H04N 21/435* | (2011.01) |
| *H04N 21/439* | (2011.01) |
| *H04N 21/44* | (2011.01) |

(52) U.S. Cl.
CPC ............ *G11B 27/005* (2013.01); *G10L 21/04* (2013.01); *G11B 20/10527* (2013.01); *H04N 5/783* (2013.01); *H04N 21/41422* (2013.01); *H04N 21/435* (2013.01); *H04N 21/439* (2013.01); *H04N 21/44* (2013.01); *G11B 2020/1062* (2013.01)

(58) Field of Classification Search
CPC .......... G11B 27/005; G11B 2020/1062; G11B 20/10527; H04N 5/783; H04N 21/41422; H04N 21/435; H04N 21/439; H04N 21/44; G10L 21/04
USPC ........................................................ 386/343
See application file for complete search history.

(56) References Cited

U.S. PATENT DOCUMENTS

| | | | |
|---|---|---|---|
| 2006/0045138 A1* | 3/2006 | Black ................. | H04L 49/9094 370/516 |
| 2008/0195746 A1 | 8/2008 | Bowra et al. | |
| 2010/0023544 A1 | 1/2010 | Shahraray et al. | |
| 2011/0106969 A1* | 5/2011 | Choudhury ...... | H04N 21/41407 709/236 |
| 2012/0262632 A1* | 10/2012 | Eskenazi ............. | H04N 21/214 348/729 |
| 2014/0005814 A1 | 1/2014 | Hwang et al. | |
| 2014/0281976 A1 | 9/2014 | Chia et al. | |
| 2016/0218829 A1 | 7/2016 | Fay et al. | |

* cited by examiner

*Primary Examiner* — Helen Shibru
(74) *Attorney, Agent, or Firm* — Rajeev Madnawat

(57) ABSTRACT

A device is disclosed. The device includes a plurality of ports to receive a plurality of audio streams, an audio content control unit configured to modify playback length of an audio content of at least one of the plurality of audio streams according to an input time interval, an audio decoder and a memory buffer coupled to the audio decoder and the audio content control unit. The memory buffer is used by the audio content control unit to buffer at least one of the plurality of audio streams.

14 Claims, 2 Drawing Sheets

82015545US01

AUDIO TIME STRETCHING

BACKGROUND

Modern broadcast receivers support multiple audio inputs from different broadcast domains such as FM, digital audio broadcast (DAB), or Internet radio. These sources normally are not aligned in time. Further, broadcast or recorded audio content typically have a predefined length and these time lengths may not align with a person's travel time when the person is traveling, for example a vehicle fitted with a global navigation satellite system (GNSS).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a device is disclosed. The device includes a plurality of ports to receive a plurality of audio streams, an audio content control unit configured to modify playback length of an audio content of at least one of the plurality of audio streams according to an input time interval, an audio decoder and a memory buffer coupled to the audio decoder and the audio content control unit. The memory buffer is used by the audio content control unit to buffer at least one of the plurality of audio streams. The plurality of audio streams may include analog radio stream, digital radio stream, Internet radio stream and locally stored audio content stream. In some embodiments, the audio content control unit is configured to modify the playback length of the audio content by 5% to 20%.

In some embodiments, the device includes a port to receive input from a navigation device and the input from the navigation device includes estimated time of arrival at a destination. The device may further include an electronic program guide (EPG) decoder to identify program information embedded in at least one of the plurality of audio streams. The device may also include a program selector to allow selection of an audio programs from a plurality of audio programs based on an output of the EPG decoder. The audio content control unit is configured to receive the input time interval from the navigation device based on a pre-inputted travel destination. The input time interval is a variable that changes according to changes in time to reach the pre-inputted destination. In some embodiments, the audio content control unit is configured to receive the input time interval from a user. The memory buffer may include separate memory spaces for each of the plurality of audio streams.

In another embodiment, a method for time stretching an audio or video (AV) stream is disclosed. The method includes (a) receiving an AV stream, (b) receiving a time interval indicating an estimated time of arrival at a destination, (c) modifying playback rate of the received AV stream to fit entire playback within the time interval, and repeating operations (b) and (c) until the destination is reached.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
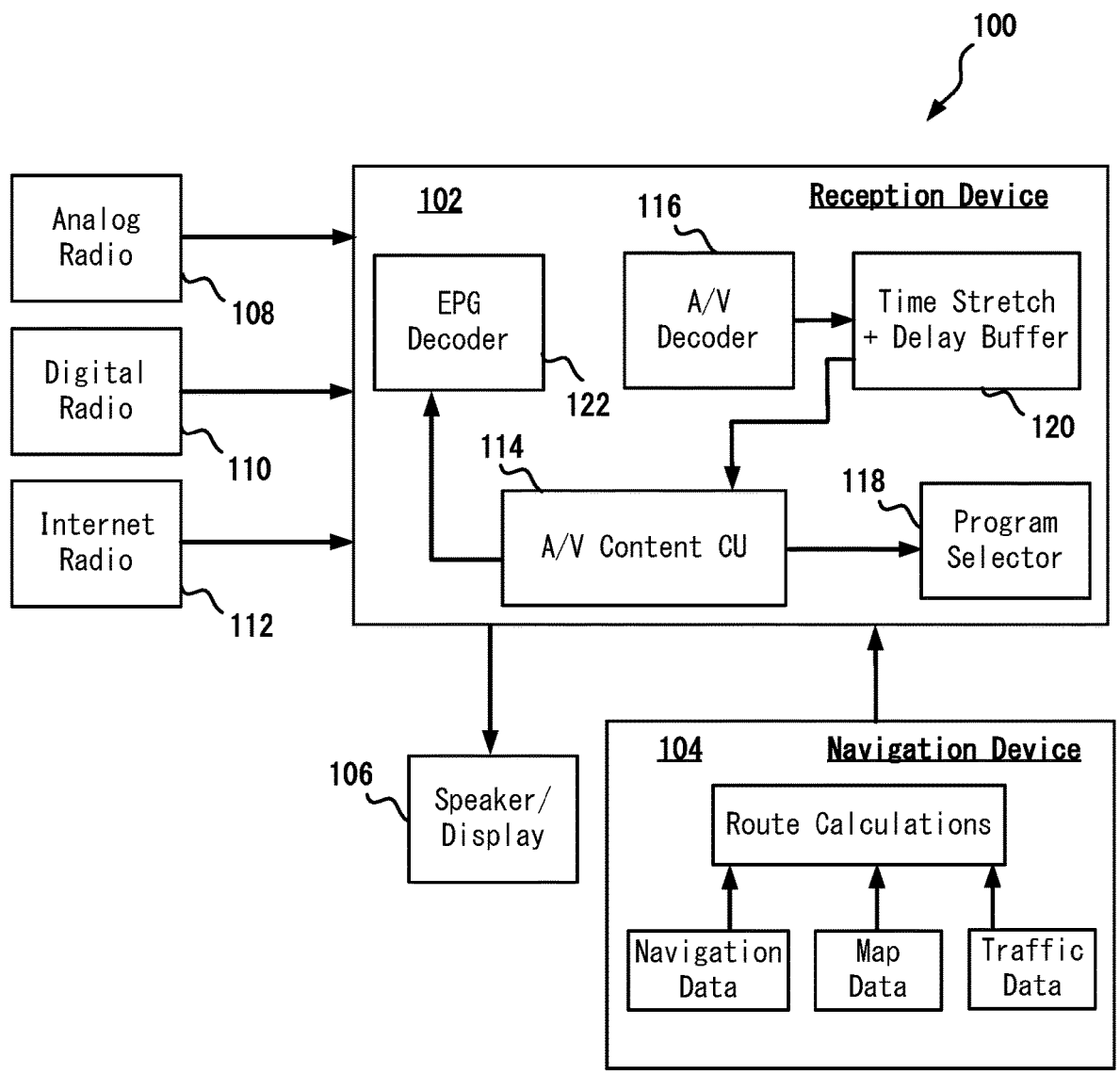
FIG. 1 shows a system for time stretching audio or video content in accordance with one or more embodiments.

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

It should be noted that the term "audio" and "audio stream" are being used throughout this document for example only in that the embodiments described herein may also be applied to video or television broadcast streams.

Navigation systems have become standard in most vehicles and are widely used as travel guides. With the use of navigation systems, travelling times can precisely be predicted. Smart phones also include navigational maps and systems that can be used to provide estimated time of arrival at a destination. The estimated time of arrival continuously updated by the navigation system based on traffic conditions and/or vehicles driving speed. Playback of an audio content may be stretched or delayed to align the end of the audio content with the estimated time of arrival.

Further, if there are multiple audio streams playing the same audio content, the streams may be aligned by introducing delay or stretching one or more of the audio streams for seamless transition between one audio stream to another. Stretching audio playback in time is a seamless method used to build up such a delay while being able to continuously listen to the audio content.

Audio content such as radio programs, audio books, concerts, generally have a predefined length. During a travel, a user may desire to listen to the entire content approximately when the user arrives at the destination. The user may choose a desired program of a predefined length based on the user's travel time. However, traffic conditions may delay or hasten the time of arrival at the destination.

Live broadcasted audio content by nature can only be delayed, i.e. playback rates can be slowed down. A playback speedup is possible after having pre-buffered a certain amount of content. If a radio broadcast program is shorter than the estimated travel time, its playback can be slowed down by applying time stretching to adjust the content runtime to the estimated travel time. Slowing down content playback requires buffering delayed content. Because broadcast speed generally remains constant, a buffer of sufficient size is needed to continuously delay received audio content. In case buffering capabilities are depleted, the playback rate may return to original playback rate. If the estimated travel time reduces, the playback rates can be increased accordingly when there is pre-buffered audio (e.g. through previous playback slow-down). Once the buffer has run empty, no further speedup is possible and the playback rate must return to the original rate again. Locally stored audio content can be a subtype of broadcast content, where the receiver's buffer can hold 100% of the content. This allows most flexibility in stretching.

Depending on a type of audio content, it is possible to stretch or compress the audio content, typically 5% to 20%, without a noticeable impact on listening experience. Fast music may be compressed or stretched less than audio content such as audio books, talk shows, etc. A buffer may be used to insert gaps or remove gaps between words or shorten or stretch the silence parts of audio content.

Broadcast processing delays for different transmission technologies can vary. Typically, traditional analogue standards such as FM have the shortest broadcast delay. Digital technologies such as DAB usually add up to a few seconds of additional delay. Internet broadcasted audio may cause higher transmission delays of several seconds. To provide a seamless transition between different transmission sources, incoming audio streams can be delayed by different proportions according to their transmission delays to align all incoming streams.

In case the playback slowdown process is applied, buffering of all received streams can be adjusted in parallel to retain the opportunity for seamless transition between them. For speeding up, the same principle is applicable until one of the received stream's buffer has run empty and thus making the source "live". Further speedup will lead to misalignment between this source and all delayed sources, which breaks some ability for seamless transitions.

FIG. 1 is a schematic of a system 100 for adjusting audio playback to fit the playback length to a fix or variable time. The fix or variable time may be inputted by a user of the system 100. Alternatively, the time may be obtained from a navigation device 104. The system 100 includes an audio time stretch/compress device 102. The audio stretch/compress device 102 may include an electronic program guide (EPG) decoder 122 and an audio/video (AV) decoder 116. The EPG decoder 122 scans the input streams to decode program names and information about the programs from the streams. The audio time stretch/compress device 102 may be incorporated in an audio playback system of, for example, a vehicle and in that example, some components such as the AV decoder 116 and the EPG decoder 122 may be shared between the audio playback system and audio stretch/compress device 102. The audio stretch/compress device 102 includes ports for receiving various types of audio streams such as analog radio stream 108, digital radio stream 110, Internet radio stream 112, CD/DVD stream and digital audio stream from portable audio players.

The audio stretch/compress device 102 may be coupled to a speaker 106 either directly or through the audio playback system. The audio stretch/compress device 102 may also be coupled to the navigation device 104 to obtain time to reach the destination in real time. The navigation device 106 may be a global navigation satellite system (GNSS) device or a mobile phone with GNSS capabilities. Most smart phones these days do includes GNSS capabilities. The navigation device 106 includes modules to receive GNSS data from satellites, geographical map data and traffic data. Based on the user's pre-selected destination, the navigation device 106 can provides an estimated time to arrive (ETA) at the destination. However, the ETA may change periodically based on traffic conditions and/or speed of the user's vehicle.

In some embodiments, the system 100 may not include the navigation device 106. Alternatively, in some embodiments, instead of obtaining the arrival time data from the navigation device 106, the time may be manually selected by the user. For example, if the user is in between tasks and may want to listen to an audio content during the time between the tasks, the user may input that time and the audio stretch/compress device 102 may attempt to either stretch or compress a selected audio content to fit the selected time.

The EPG decoder 122 retrieves program information and based on a user's input through a program selector 118, the input audio stream providing a selected program are decoded by the AV decoder 116. An alignment delay among the decoded input streams is calculated and appropriate amount of delay is introduced to make at least two or more input streams aligned in time. A memory buffer 120 is used to store incoming streams. An AV content control unit 114 calculates the delays that are necessary to time align input streams. The audio content control unit 114 may include a processor and a memory and in some embodiments, the time stretch/delay buffer 120 may be incorporated in that memory. In some embodiments, the time stretch/delay buffer 120 may include separate locations for each of the input audio streams. The AV content control unit 114 may be implemented in hardware or through programming instructions that can be executed by the processor.

In addition to time aligning input audio streams, the AV content control unit 114 may also receive estimate time of arrival from the navigation device 104 change the stream play rate accordingly. For example, if the selected program length is shorter than the estimated time of arrival provided by the navigation device 104, the AV content control unit 114 may slow the play rate such that the select program ends approximately at the end of the estimated time. As stated above, the estimated time may also be inputted by the user. In some embodiments, after the user inputs an estimated time or the estimated time is obtained from the navigation device 104, the program selector 118 may display or announce suitable programs that may fit, after processing by the AV content control unit 114, within the estimated time interval.

As stated above, if the estimated time may change during a playback of an audio content. The AV content control unit 114 monitors remaining estimated time and adjusts the audio stream being played either by making the playback rate slower or faster using the time stretch/delay buffer 120. In some embodiments, a user may select more than one programs to be played during a selected time slot and if a first selected program ends prior to the end of the estimated time of arrival (e.g., when due to the travel is delayed beyond previous estimated time of arrival) based on the variable estimated time, the AV content control unit 114 may start playing another program from the selection that is likely to fit the remaining duration of the estimated time of arrival.

Figure 2:
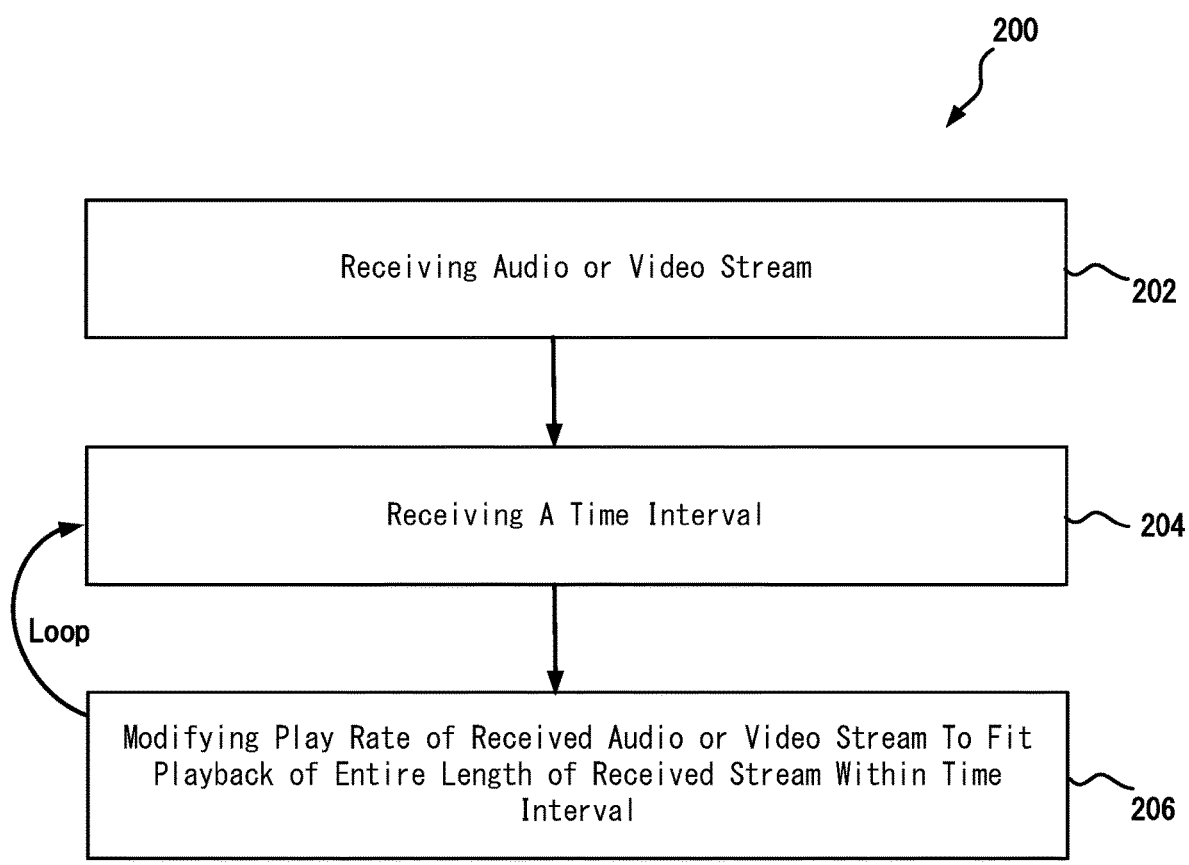
FIG. 2 illustrates a method for time stretching audio or video content in accordance with one or more embodiments.

FIG. 2 illustrates a method 200 for time stretching an audio or video content. Accordingly, at step 202, an audio or a video (AV) stream is received. At step 204, a time interval within which the received AV stream is intended to be played. The time interval may be received from a navigation device based on the estimated time of arrival at a destination when a user is traveling in a vehicle. The AV content control unit 114 modifies the playback rate of the received AV stream to fit to the time interval. In some embodiments, the estimated time of arrival may be changing continuously based on traffic conditions, the AV content control unit 114 continues to modify the AV stream according to the updated time interval received from the navigation device.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A device, comprising:
    a plurality of ports to receive a plurality of audio or video (AV) streams;
    an AV content control unit configured to modify playback length of an AV content of at least one of the plurality of AV streams according to an input time interval;
    an AV decoder; and
    a memory buffer coupled to the audio decoder and the AV content control unit, wherein the memory buffer is used by the AV content control unit to buffer at least one of the plurality of AV streams.

2. The device of claim 1, further including a port to receive input from a navigation device.

3. The device of claim 2, wherein the input from the navigation device includes estimated time of arrival at a destination.

4. The device of claim 1, further including an electronic program guide (EPG) decoder to identify program information embedded in at least one of the plurality of AV streams.

5. The device of claim 1, further including a program selector to allow selection of an AV programs from a plurality of audio programs based on an output of the EPG decoder.

6. The device of claim 3, wherein the AV content control unit is configured to receive the input time interval from the navigation device based on a pre-inputted travel destination.

7. The device of claim 6, wherein the input time interval is a variable that changes according to changes in time to reach the pre-inputted destination.

8. The device of claim 1, wherein the AV content control unit is configured to receive the input time interval from a user.

9. The device of claim 1, wherein the memory buffer includes separate memory spaces for each of the plurality of AV streams.

10. The device of claim 1, wherein the plurality of audio streams includes analog radio stream, digital radio stream, Internet radio stream, digital video streams and locally stored AV content stream.

11. The device of claim 1, wherein the AV content control unit is configured to modify the playback length of at least one of the AV streams by 5% to 20%.

12. A method for time stretching an audio or video (AV) stream, the method comprising:
    (a) receiving an AV stream;
    (b) receiving a time interval indicating an estimated time of arrival at a destination;
    (c) modifying playback rate of the received AV stream to fit entire playback within the time interval; and
    (d) repeating operations (b) and (c) until the destination is reached.

13. The method of claim 12, further including identifying program information embedded in the AV stream using an electronic program guide (EPG) decoder.

14. The method of claim 12, wherein the modifying includes altering playback length of the AV content by 5% to 20%.

* * * * *